US008259191B2

(12) United States Patent
Kanemitsu et al.

(10) Patent No.: US 8,259,191 B2
(45) Date of Patent: Sep. 4, 2012

(54) BACKLIGHT ADJUSTMENT DEVICE OF CAMERA-EQUIPPED TERMINAL AND TERMINAL

(75) Inventors: Shiroshi Kanemitsu, Yokohama (JP); Takaaki Kawakami, Kamakura (JP); Junichi Hosokawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 510 days.

(21) Appl. No.: 12/475,951

(22) Filed: Jun. 1, 2009

(65) Prior Publication Data

US 2009/0303346 A1 Dec. 10, 2009

(30) Foreign Application Priority Data

Jun. 4, 2008 (JP) ................................ 2008-147109

(51) Int. Cl.
*H04N 5/235* (2006.01)
*H04N 5/222* (2006.01)

(52) U.S. Cl. ............ 348/229.1; 348/333.13; 348/221.1; 348/362

(58) Field of Classification Search ........................ None
See application file for complete search history.

(56) References Cited

U.S. PATENT DOCUMENTS

| | | | | |
|---|---|---|---|---|
| 7,928,955 | B1 * | 4/2011 | Bell | 345/102 |
| 2006/0132424 | A1 * | 6/2006 | Foo et al. | 345/102 |
| 2007/0268241 | A1 * | 11/2007 | Nitta et al. | 345/102 |
| 2007/0279373 | A1 * | 12/2007 | Tseng et al. | 345/102 |

FOREIGN PATENT DOCUMENTS

| | | |
|---|---|---|
| JP | 11-46320 | 2/1999 |
| JP | 2001-223792 | 8/2001 |
| JP | 2002-344598 | 11/2002 |
| JP | 2003-289368 | 10/2003 |
| JP | 2004-96760 | 3/2004 |
| JP | 2005-39763 | 2/2005 |
| JP | 2006-133295 | 5/2006 |
| JP | 3882522 | 11/2006 |
| JP | 2007-67889 | 3/2007 |
| JP | 2007-96950 | 4/2007 |
| JP | 2007-142866 | 6/2007 |
| JP | 2007-318673 | 12/2007 |
| JP | 2008-92149 | 4/2008 |
| JP | 2008-113333 | 5/2008 |

OTHER PUBLICATIONS

Office Action issued Jan. 10, 2012, in Japanese Patent Application No. 2008-147109 (with English language translation).
Office Action issued Jul. 10, 2012, in Japanese Patent Application No. 2008-147109 (with English language translation).

* cited by examiner

*Primary Examiner* — Luong T Nguyen
(74) *Attorney, Agent, or Firm* — Oblon, Spivak, McClelland, Maier & Neustadt, L.L.P.

(57) ABSTRACT

A backlight adjustment device of a camera equipped terminal of an example of the invention comprises a storage unit which stores relational data indicating relationship between an integrated value and a luminance, an integrated value calculation unit which determines an integrated value of imaging data of a camera or data in a predetermined range of the imaging data, a first control unit which determines a luminance with respect to the integrated value determined by the integrated value calculation unit based on the relational data stored in the storage unit, and a second control unit which controls brightness of a backlight of an image display unit according to the luminance determined by the first control unit.

13 Claims, 4 Drawing Sheets

| A1(T1) | | · · · · · · | An(Tn) | |
|---|---|---|---|---|
| Integrated value | Luminance | | Integrated value | Luminance |
| | | | | |
| ⋮ | ⋮ | · · · · · · | ⋮ | ⋮ |
| | | | | |
| | | | | |

BACKLIGHT ADJUSTMENT DEVICE OF CAMERA-EQUIPPED TERMINAL AND TERMINAL

CROSS-REFERENCE TO RELATED APPLICATIONS

This application is based upon and claims the benefit of priority from prior Japanese Patent Application No. 2008-147109, filed Jun. 4, 2008, the entire contents of which are incorporated herein by reference.

BACKGROUND OF THE INVENTION

1. Field of the Invention

The present invention relates to a backlight adjustment device which adjusts brightness of a backlight of an image display device provided in a camera-equipped terminal, and the terminal.

2. Description of the Related Art

In the past, in order to reduce power consumption, an approach of adjusting a liquid crystal backlight based on an output result of an element for detecting brightness such as a luminance sensor has been employed.

If an element for detecting brightness is further added to a camera-equipped cellular phone or personal computer, the system, cost, and dimensions of the device will inevitably increase.

Document 1 (Jpn. Pat. Appln. KOKAI Publication No. 2001-223792) discloses a technique of detecting a luminance of a marginal environment using an image sensor and controlling on/off switching of a liquid crystal backlight based on the detected luminance.

Document 2 (Japanese Patent No. 3882522) discloses a camera-equipped portable terminal which controls brightness of a display means, using at least one of a shutter speed and a gain value of an imaging means, and a photometric result of a photometric means which performs photometry based on output data from the imaging means. The portable terminal turns off the backlight if the shutter speed exceeds a predetermined value, and turns on the backlight if the shutter speed is less than or equal to a predetermined value.

When an image sensor is used as above, a detection result may not be determined with high accuracy unless the exposure time is adjusted.

BRIEF SUMMARY OF THE INVENTION

A backlight adjustment device of a camera equipped terminal of an example of the invention comprises a storage unit which stores relational data indicating relationship between an integrated value and a luminance, an integrated value calculation unit which determines an integrated value of imaging data of a camera or data in a predetermined range of the imaging data, a first control unit which determines a luminance with respect to the integrated value determined by the integrated value calculation unit based on the relational data stored in the storage unit, and a second control unit which controls brightness of a backlight of an image display unit according to the luminance determined by the first control unit.

A terminal of an example of the invention comprises a camera, an image display device, a backlight of the image display device, a storage unit which stores relational data indicating relationship between an integrated value and a luminance, an integrated value calculation unit which determines an integrated value of imaging data of the camera or data in a predetermined range of the imaging data, a first control unit which determines a luminance with respect to the integrated value determined by the integrated value calculation unit based on the relational data stored in the storage unit, and a second control unit which controls brightness of a backlight of an image display unit according to the luminance determined by the first control unit.

DETAILED DESCRIPTION OF THE INVENTION

Hereinafter, an embodiment of the present invention will be described with reference to the accompanying drawings. Throughout the drawings, the same structural elements will be denoted by the same reference numbers.

In the present embodiment, descriptions will be given with respect to a backlight adjustment device of a camera-equipped terminal device, which uses a photographic camera and which is a small system, a low cost, and small package dimensions, without the need to add a luminance sensor, for example.

Figure 1:
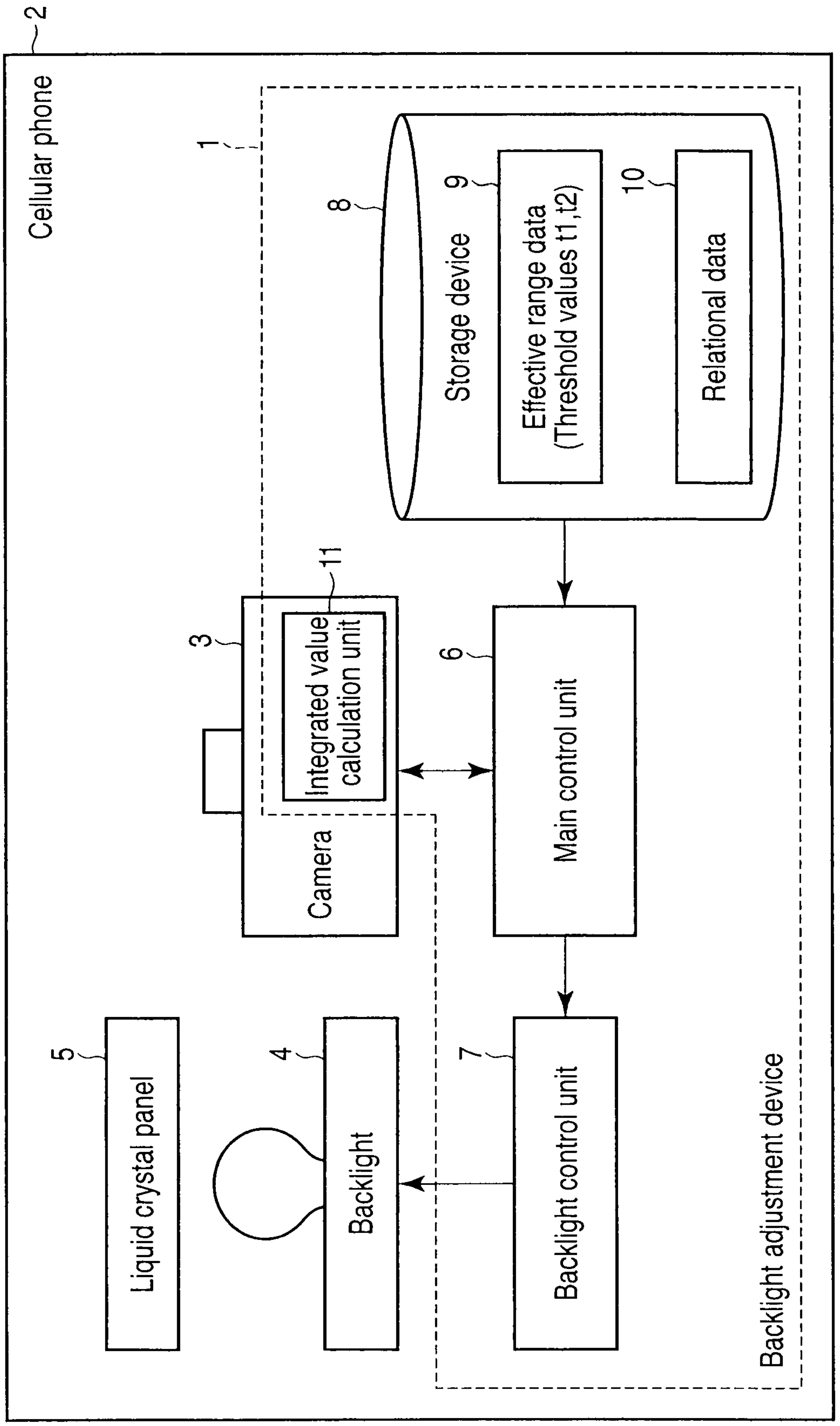
FIG. 1 is a block diagram illustrating an example of a backlight adjustment device of a camera-equipped terminal according to an embodiment of the present invention.

FIG. 1 is a block diagram illustrating an example of a backlight adjustment device of a camera-equipped terminal according to an embodiment of the present invention.

A backlight adjustment device 1 is provided in a camera-equipped terminal such as a portable terminal. In the present embodiment, a cellular phone 2 will be described as an example of the camera-equipped terminal, but any other terminal may be used, such as a personal computer, a personal digital assistant (PDA), or a digital camera.

The cellular phone 2 comprises a camera 3, the backlight adjustment device 1, a backlight 4, and an image display device. In the present embodiment, a liquid crystal panel 5 will be described as an example of the image display device, but the image display device may be any other display media, such as an organic electroluminescent display. The camera 3 may be fixedly or detachably provided.

The backlight adjustment device 1 includes a main control unit 6, a backlight control unit 7, a storage device 8, and an integrated value calculation unit 11. In the present embodiment, the integrated value calculation unit 11 is provided in the camera 3. In the backlight adjustment device 1, the main control unit 6 calculates a luminance (an ambient luminance) based on an output result from the camera 3, and relational data 10 between a camera output result and a luminance stored in the storage device 8 in advance, and the backlight control unit 7 controls the backlight 4 based on the result of calculation.

When the cellular phone 2 comprising the backlight adjustment device 1 is activated from an initial state or a standby state, the main control unit 6 sets an initial exposure time (a fixed exposure time) in the camera 3.

After exposure for the set exposure time, the camera 3 integrates data values in photographic image data or a predetermined range of the photographic image data, and transmits the integrated value to the main control unit 6. In the present embodiment, the integrated value is determined by the camera 3, but the photographic image data or data in the predetermined range (a camera output result) may be transmitted from the camera 3 to the main control device, and the integrated value may be calculated by the main control unit 6. The integration in the present embodiment refers to calculation in which numerical values are sequentially added.

The main control unit 6 determines, based on effective range data 9 stored in the storage device 8 and indicating an integrated value effective range of integrated value corresponding to the exposure time set in the camera 3, whether the integrated value received from the camera 3 falls within the effective range.

If the integrated value received from the camera 3 does not fall within the effective range, the main control unit 6 sets a new exposure time in the camera 3, and receives a new integrated value with respect to the new exposure time from the camera 3. For example, if the received integrated value is greater than or equal to a threshold value t1 indicating an upper limit of the effective range, the main control unit 6 determines that the received integrated value is close to saturation and that accuracy will deteriorate if brightness of the backlight 4 is controlled using such an integrated value. In this case, the main control unit 6 sets the new exposure time less than the set exposure time in the camera 3. The same process is repeated until the integrated value received from the camera 3 becomes less than the predetermined threshold value t1. In this example, the initial exposure time is rather long at an initial stage, and the exposure time is decreased gradually, and the exposure time in a case where the integrated value becomes less than the threshold value t1 is determined.

In the above-described example, It is determined that the received integrated value is included the effective range when the received integrated value is less than the threshold value t1. However, when the received integrated value is insufficient, the accuracy will deteriorate if used to control brightness of the backlight 4. Considering such a case, when the received integrated value is smaller than or equal to a threshold value t2 indicating a lower limit of an effective range, the main control unit 6 may set a new exposure time longer than the set exposure time in the camera 3. After that, the main control unit 6 repeats the same process until the integrated value received from the camera 3 becomes greater than the predetermined threshold value t2. In this case, the exposure time is set rather short at an initial stage and increased gradually, and the exposure time in a case where the integrated value is greater than the threshold value t2 is determined.

The main control unit 6 may use both the threshold value t1 indicating the upper limit of the effective range and the threshold value t2 indicating the lower limit thereof. In this case, the main control unit 6 determines whether the integrated value determined by the integrated value calculation unit 11 is less than threshold value t1, and whether the integrated value determined by the integrated value calculation unit 11 is greater than threshold value t2. Upon determining that the integrated value determined by the integrated value calculation unit 11 is less than threshold value t1 and greater than threshold value t2, the main control unit 6 determines a luminance with respect to the integrated value in the exposure time set in the camera 3, based on the relational data 10. Upon determining that the integrated value determined by the integrated value calculation unit 11 is greater than or equal to threshold value t1, the main control unit 6 sets in the camera 3 an exposure time less than the exposure time set in the camera 3. Upon determining that the integrated value determined by the integrated value calculation unit 11 is less than or equal to the threshold value t2, the main control unit 6 sets in the camera 3 an exposure time longer than the exposure time set in the camera 3.

Thus, accuracy of the integrated value may be improved based on determination that the integrated value less than the threshold value t1 and greater than the threshold value t2 falls within the effective range.

The effective range denoted by the effective range data 9 may be a specific range set regardless of the exposure time, or may be different ranges set according to the exposure time.

As described above, when the integrated value received from the camera 3 falls within the effective range (such as a case where the integrated value received from the camera 3 is less than a predetermined threshold value), the main control unit 6 determines a luminance (an ambient luminance) corresponding to the integrated value received from the camera 3 based on the relational data 10 (data table, for example) stored in the storage device 8 and indicating relationship between the integrated value and the luminance in the exposure time set in the camera 3. After that, the main control unit 6 transmits the determined luminance to the backlight control unit 7.

The backlight control unit 7 controls brightness of the backlight 4 according to the received luminance. The storage device 9 may store brightness determination data in which the luminance and target brightness of the backlight 4 are correlated. The backlight control unit 7 may determine the target brightness with respect to the luminance received from the main control unit 6 based on the brightness determination data, and control the backlight 4 such that the determined target brightness is achieved.

Figure 2:
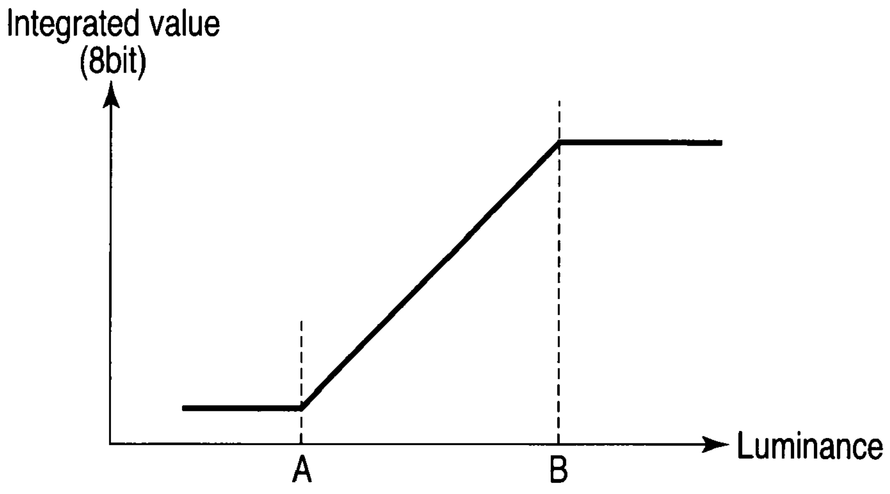
FIG. 2 a graph illustrating an example of relationship between luminances and image integrated values with respect to a predetermined exposure time.

FIG. 2 is a graph illustrating an example of relationship between luminances and image integrated values with respect to a predetermined exposure time.

In the ranges of luminances A and B, linear characteristics of integrated values are obtained. By using the relationship shown in FIG. 2, a luminance can be determined from an integrated value.

Figure 3:
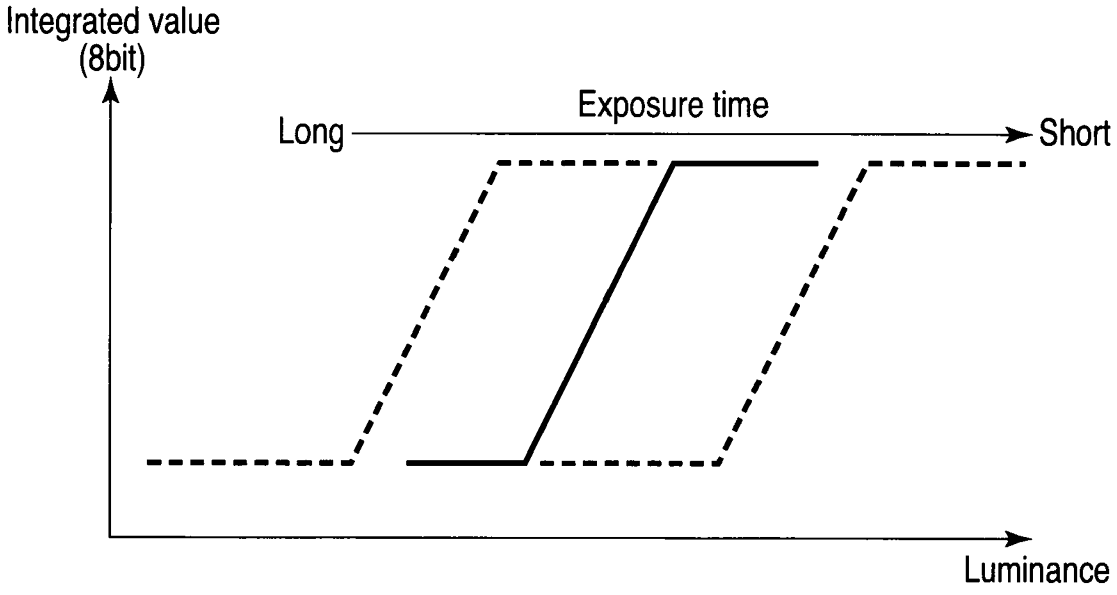
FIG. 3 is a graph illustrating an example of relationship between luminances and image integrated values with respect to different exposure times.

FIG. 3 is a graph illustrating an example of relationship between luminances and image integrated values with respect to different exposure times.

According to the exposure time, the relationship between the luminance and the integrated value is shifted in parallel to the axis of luminance. With respect to the same integrated value, greater luminance is determined as the exposure time becomes shorter. In general, the range of light required for a luminance sensor is said to be approximately from 1 lux to 65000 lus. For example, even if an integrated value in the output range of the camera 3 cannot be applied to a range of light comparable to that of a luminance sensor with respect to a predetermined exposure time, by switching the exposure time according to the integrated value, the integrated value can be applied to a range of light comparable to that of a case where such a luminance sensor is used.

Figures 4, 5:
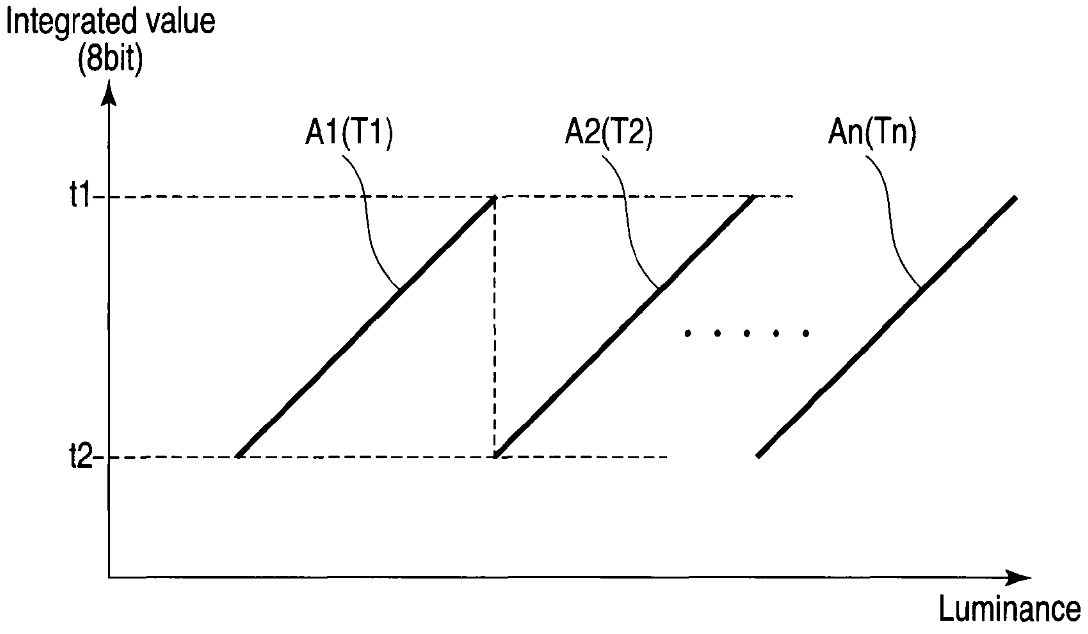
FIG. 4 is a graph illustrating an example of relationship between integrated values and luminances according to different exposure times and threshold values t1, t2.
FIG. 5 is a data table illustrating an example of relational data.

FIG. 4 is a graph illustrating an example of relationship between the integrated value and the luminance according to different exposure times and threshold values t1, t2.

A1 denotes relationship between the luminance and the integrated value with respect to an initially set exposure time T1. A2 denotes the relationship between the luminance and the integrated value with respect to an exposure time T2 less than the fixed exposure time T1. Similarly, A3-An denote relationships between the luminance and the integrated value with respect to exposure times T3-Tn less than exposure times T2-Tn−1, respectively.

If the integrated value determined with respect to the exposure time T1 is less than the threshold value t1, a luminance corresponding to the determined integrated value is determined based on the relationship A1 between the luminance and the integrated value with respect to exposure time T1.

If the integrated value determined with respect to exposure time T1 is greater than or equal to the threshold value t1, which is close to saturation, an integrated value in an exposure time T2 less than exposure time T1 is determined, so as to prevent the accuracy from deteriorating. If the integrated value determined with respect to the exposure time T2 is less than threshold value t1, luminance corresponding to the determined integrated value is determined based on the relationship A2 between the luminance and the integrated value with respect to exposure time T2.

Setting of the exposure time is repeated until the determined integrated value becomes less than the threshold value t1.

In the present embodiment, when the determined integrated value is greater than or equal to the threshold value t1, it is determined that saturation has been reached. In this case, in order to prevent the accuracy from deteriorating, a shorter exposure time is set in the camera 3, and a luminance is calculated based on a new integrated value and a data table in the newly set exposure time.

Thereby, brightness of the backlight 4 can be changed with high accuracy with respect to a wide range of light.

The processing regarding the threshold value t2 will be performed in an order opposite to that of the threshold value t1; that is, if the determined integrated value is less than or equal to the threshold value t2, the process is executed such that the exposure time becomes longer.

FIG. 5 is a data table illustrating an example of the relational data 10.

The relational data 10 manages relations A1-An between the integrated value and the luminance with respect to different exposure times T1-Tn.

In the present embodiment, a luminance is determined from a data table in which relationship between the integrated value and the luminance is associated with respect to each of the exposure times. Instead of this approach, a luminance may be determined by calculation based on an integrated value, for example.

Figure 6:
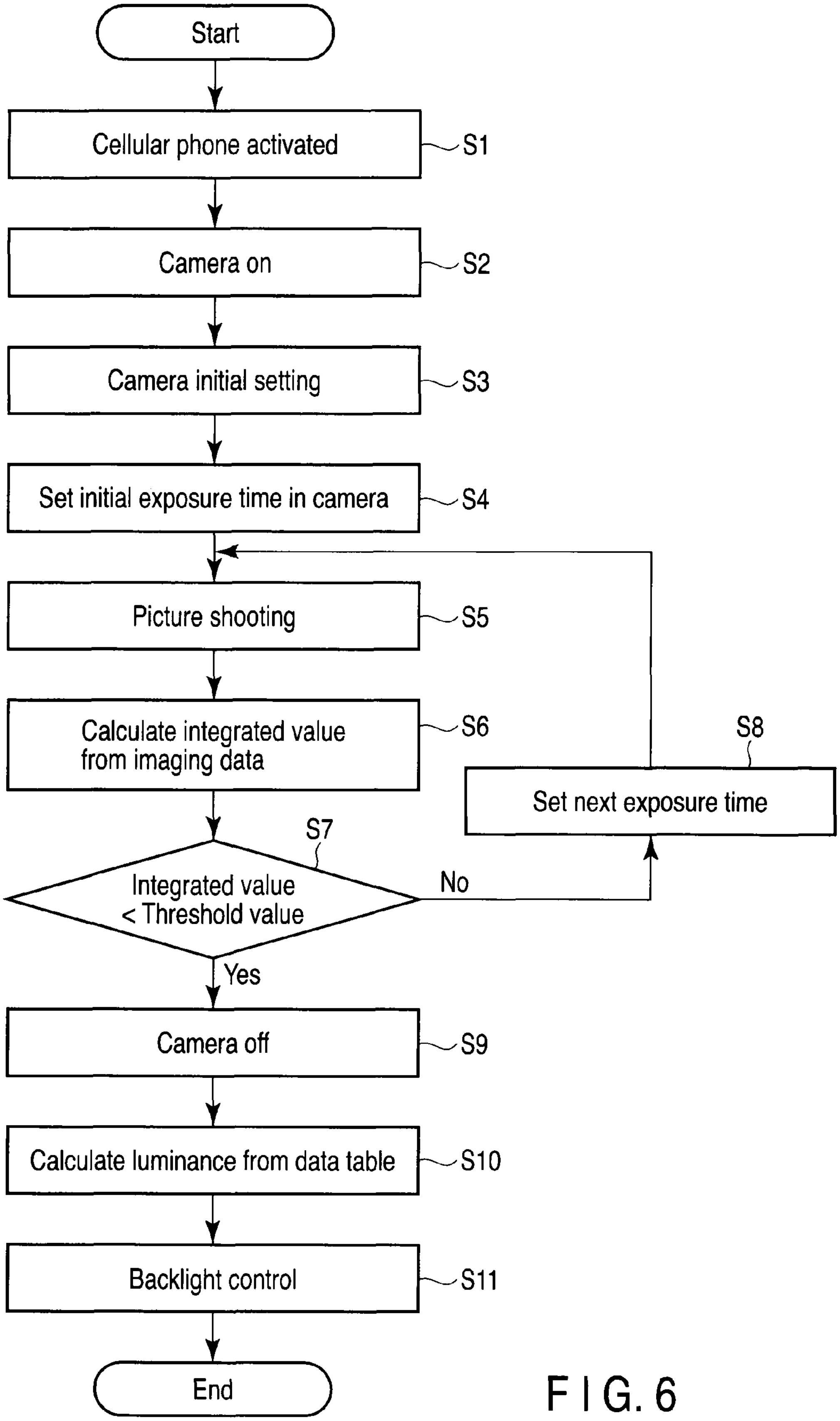
FIG. 6 is a flowchart illustrating an example of a process of the terminal comprising the backlight adjustment device according to the embodiment.

FIG. 6 is a flowchart illustrating an example of the process of the cellular phone 2 comprising the backlight adjustment device 1 according to the present embodiment.

In step S1, the cellular phone 2 is activated.

In step S2, the camera 3 is set to an on state.

In step S3, the main controlling unit 6 performs initial setting of the camera 3.

In step S4, the main controlling unit 6 sets the exposure time of the camera 3 to the initial exposure time T1 based on the relational data 10 in the storage device 8.

In step S5, the camera 3 performs an imaging operation.

In step S6, the camera 3 calculates an integrated value of a predetermined range of imaging data.

In step S7, the main control unit 6 determines whether the determined integrated value is less than threshold value t1 based on the effective range data 9 stored in the storage device 8.

If the determined integrated value is greater than or equal to threshold value t1, in step S8, the main control unit 6 sets the exposure time of the camera 3 as the next exposure time T2 based on the relational data 10 in the storage device 8. After that, the process returns to step S5. The same process is repeated until it is determined that the determined integrated value is less than threshold value t1.

If the determined integrated value is less than threshold value t1, in step S9, the camera 3 is set to an off state.

In step S10, the main control unit 6 determines a luminance based on the relational data 10 comprising relationship between the integrated value and the luminance with respect to the exposure time set in the camera 3.

In step S11, the backlight control unit 7 controls brightness of the backlight 4 according to the determined luminance.

As described above, the cellular phone according to the present embodiment comprises the liquid crystal panel 5, the backlight 4, the backlight adjustment device 1, and the camera 3, determines an ambient luminance based on the camera output result and data stored in advance, and adjusts brightness of the backlight 4 of the liquid crystal panel 5. This eliminates the necessity to use the conventional luminance sensor, and reduces the system, the device cost, and the package dimensions. Further, by changing brightness of the backlight 4 as necessary, the power consumption of the cellular phone 2 can be reduced.

In the present embodiment, the exposure time stored in advance is set in the camera 3, and the backlight 4, such as a LCD backlight, is controlled using the integrated value determined based on an imaging data determined from the camera 3. Therefore, according to the present embodiment, the calculation for control can be simplified and the processing speed can be increased. The backlight adjustment using the camera 3 according to the present embodiment allows fast-speed adjustment of brightness of the backlight 4 in a case where the camera 3 is set to an on state or in a redisplay operation of the backlight 4 after an energy-saving mode is set.

In the present embodiment, an integrated value in a predetermined range of imaging data taken by the camera 3 in a certain exposure time is used as a camera output result. By thus using the integrated value, the ambient luminance can be determined with high accuracy even when the camera output result is used instead of the measurement result of a luminance sensor.

In the present embodiment, if the integrated value determined from the certain exposure time is greater than or equal to the predetermined threshold value t1, it is determined as being overexposed with respect to the ambient luminance, and exposure is performed again with an exposure time less than the set exposure time and an integrated value determined. A luminance is determined in a case where the integrated value determined from the new exposure time becomes less than the predetermined threshold value t1. Thereby, brightness of the backlight 4 can be adjusted with respect to a wide range of luminance.

In the present embodiment, data of various kinds used in the main control unit 6 or the backlight control unit 7 may be provided in the main control unit 6 or the backlight control unit 7, instead of being stored in the storage device 8.

In the present embodiment, if the determined integrated value is greater than or equal to the threshold value t1, it is determined as being overexposed, and a shorter exposure time is set. Instead of this approach, the integrated value may be determined as being underexposed when the determined integrated value is less than or equal to the predetermined threshold value t2 less than the threshold value t1, and exposure may be performed again in an exposure time longer than the set exposure time, for example. Further, in the present embodiment, the luminance may be determined based on relationship between the integrated value and the luminance corresponding to the exposure time, based on which the integrated value has been determined, in a case where the determined integrated value falls within an effective range, based on determination as to whether the integrated value falls within the effective range using both of the threshold values t1, t2. Thereby, brightness of the backlight 4 can be adjusted with respect to a broad range of luminance.

The structural elements described in the present embodiment may be combined or divided as appropriate. For example, the integrated value calculation unit 11 and the main control unit 6 may be combined, or the main control unit 6 and the backlight control unit 7 may be combined.

What is claimed is:

1. A backlight adjustment device of a camera-equipped terminal, comprising:

a storage unit which stores relational data indicating relationship between an integrated value and a luminance;

an integrated value calculation unit which determines an integrated value of imaging data of a camera or data in a predetermined range of the imaging data;

a first control unit which determines the luminance with respect to the integrated value of the imaging data of the camera determined by the integrated value calculation unit based on the relational data stored in the storage unit; and a second control unit which controls brightness of a backlight of an image display unit according to the luminance determined by the first control unit, wherein the relational data indicates relationship between the integrated value and the luminance with respect to a plurality of exposure times, the integrated value calculation unit determines the integrated value of the imaging data of the camera in an exposure time set in the camera, and the first control unit determines whether the integrated value determined by the integrated value calculation unit falls within an effective range, and determines the luminance with respect to the integrated value of the imaging data of the camera in the exposure time set in the camera, based on the relational data, upon determining that the determined integrated value falls within the effective range, and switches the exposure time set in the camera upon determining that the determined integrated value falls outside the effective range.

2. The backlight adjustment device according to claim 1, wherein the first control unit performs the following:

determining whether the integrated value of the imaging data of the camera determined by the integrated value calculation unit is less than a predetermined threshold value;

determining the luminance with respect to the integrated value in the exposure time set in the camera, based on the relational data, upon determining that the integrated value determined by the integrated value calculation unit is less than the predetermined threshold value; and setting in the camera an exposure time less than the exposure time set in the camera, in a case where the integrated value determined by the integrated value calculation unit is greater than or equal to the predetermined threshold value.

3. The backlight adjustment device according to claim 1, wherein the first control unit performs the following:

determining whether the integrated value of the imaging data of the camera determined by the integrated value determination unit is greater than a predetermined threshold value;

obtaining the luminance with respect to the integrated value in an exposure time set in the camera, based on the relational data, upon determining that the integrated value determined by the integrated value determination unit is greater than the predetermined threshold value; and setting in the camera an exposure time longer than the exposure time set in the camera, in a case where the integrated value determined by the integrated value calculation unit is less than or equal to the predetermined threshold value.

4. The backlight adjustment device according to claim 1, wherein the first control unit performs the following:

determining whether the integrated value of the imaging data of the camera determined by the integrated value determination unit is less than a first threshold value indicating an upper limit of the effective range, and whether the integrated value determined by the integrated value determination unit is greater than a second threshold value indicating a lower limit of the effective range;

determining the luminance with respect to the integrated value in an exposure time set in the camera, based on the relational data, upon determining that the integrated value determined by the integrated value determination unit is less than the first threshold value and greater than the second threshold value;

setting in the camera an exposure time less than the exposure time being set in the camera, upon determining that the integrated value determined by the integrated value determination unit is greater than or equal to the first threshold value; and setting in the camera an exposure time longer than the exposure time set in the camera, upon determining that the integrated value determined by the integrated value determination unit is less than or equal to the second threshold value.

5. The backlight adjustment device according to claim 1, wherein the relational data stored in the storage unit is table data.

6. The backlight adjustment device according to claim 1, wherein the relational data stored in the storage unit is a relational expression by which the luminance is calculated based on the integrated value.

7. A terminal comprising:

a camera;

an image display device;

a backlight of the image display device;

a storage unit which stores relational data indicating relationship between an integrated value and a luminance;

an integrated value calculation unit which determines an integrated value of imaging data of the camera or data in a predetermined range of the imaging data;

a first control unit which determines the luminance with respect to the integrated value of the imaging data of the camera determined by the integrated value calculation unit based on the relational data stored in the storage unit; and a second control unit which controls brightness of a backlight of an image display unit according to the luminance determined by the first control unit, wherein the relational data indicates relationship between the integrated value and the luminance with respect to a plurality of exposure times, the integrated value calculation unit determines the integrated value of the imaging data of the camera in an exposure time set in the camera, and the first control unit determines whether the integrated value determined by the integrated value calculation unit falls within an effective range, and determines the luminance with respect to the integrated value in the exposure time set in the camera, based on the relational data, upon determining that the determined integrated value falls within the effective range, and switches the exposure time set in the camera upon determining that the determined integrated value falls outside the effective range.

8. The terminal according to claim 7, wherein the first control unit performs the following:

determining whether the integrated value of the imaging data of the camera determined by the integrated value calculation unit is less than a predetermined threshold value;

determining the luminance with respect to the integrated value in the exposure time set in the camera, based on the relational data, upon determining that the integrated value determined by the integrated value calculation unit is less than the predetermined threshold value; and setting in the camera an exposure time less than the exposure time set in the camera, in a case where the integrated value determined by the integrated value calculation unit is greater than or equal to the predetermined threshold value.

9. The terminal according to claim 7, wherein the first control unit performs the following:

determining whether the integrated value of the imaging data of the camera determined by the integrated value determination unit is greater than a predetermined threshold value;

obtaining the luminance with respect to the integrated value in an exposure time set in the camera, based on the relational data, upon determining that the integrated value determined by the integrated value determination unit is greater than the predetermined threshold value; and setting in the camera an exposure time longer than the exposure time set in the camera, in a case where the integrated value determined by the integrated value calculation unit is less than or equal to the predetermined threshold value.

10. The terminal according to claim 7, wherein the first control unit performs the following:

determining whether the integrated value of the imaging data of the camera determined by the integrated value determination unit is less than a first threshold value indicating an upper limit of the effective range, and whether the integrated value determined by the integrated value determination unit is greater than a second threshold value indicating a lower limit of the effective range;

determining the luminance with respect to the integrated value in an exposure time set in the camera, based on the relational data, upon determining that the integrated value determined by the integrated value determination unit is less than the first threshold value and greater than the second threshold value;

setting in the camera an exposure time less than the exposure time being set in the camera, upon determining that the integrated value determined by the integrated value determination unit is greater than or equal to the first threshold value; and setting in the camera an exposure time longer than the exposure time set in the camera, upon determining that the integrated value determined by the integrated value determination unit is less than or equal to the second threshold value.

11. The terminal according to claim 7, wherein the relational data stored in the storage unit is table data.

12. The terminal according to claim 7, wherein the relational data stored in the storage unit is a relational expression by which the luminance is calculated based on the integrated value.

13. The terminal according to claim 7, wherein the first control unit comprises the integrated value calculation unit.

* * * * *